(12) United States Patent
Becker et al.

(10) Patent No.: US 8,732,057 B1
(45) Date of Patent: May 20, 2014

(54) SYSTEMS AND METHODS FOR ADMINISTERING SELF-SERVICE MUTUAL FUND AND IRA DISTRIBUTIONS TO PARTICIPANTS

(75) Inventors: Devin Michael Becker, San Antonio, TX (US); Aaron David Bend, San Antonio, TX (US); Dennis Michael Berry, Jr., San Antonio, TX (US); John Richard Camacho, Helotes, TX (US); Steven Wayne Meier, Jr., San Antonio, TX (US); Brent Myron Merryman, Victoria, TX (US); Donna Ray Molinar, San Antonio, TX (US); Marcus David Saenz, San Antonio, TX (US); Christopher Michael Stegge, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 540 days.

(21) Appl. No.: 12/428,022

(22) Filed: Apr. 22, 2009

(51) Int. Cl.
G06Q 40/00 (2012.01)
G06Q 40/06 (2012.01)

(52) U.S. Cl.
CPC .................................. G06Q 40/06 (2013.01)
USPC ........................................ 705/36 T; 705/35

(58) Field of Classification Search
CPC .................................................... G06Q 40/06
See application file for complete search history.

(56) References Cited

U.S. PATENT DOCUMENTS

| 6,804,786 B1 * | 10/2004 | Chamley et al. ................. 726/20 |
| 7,630,929 B1 * | 12/2009 | Fisher et al. ................. 705/36 T |
| 2003/0018557 A1 | 1/2003 | Gilbert et al. |
| 2003/0105692 A1 * | 6/2003 | Gilbert et al. ................. 705/35 |
| 2003/0120508 A1 | 6/2003 | Kizor et al. |
| 2003/0182147 A1 * | 9/2003 | Mahoney et al. ................. 705/1 |
| 2003/0187694 A1 | 10/2003 | Rowen |
| 2003/0187768 A1 | 10/2003 | Ryan et al. |
| 2003/0233278 A1 * | 12/2003 | Marshall ................. 705/14 |
| 2007/0057036 A1 * | 3/2007 | Santa Cruz et al. ........... 235/380 |
| 2007/0106581 A1 * | 5/2007 | Mitchell et al. ................. 705/35 |
| 2008/0189224 A1 * | 8/2008 | Coopersmith ............... 705/36 T |
| 2010/0076875 A1 * | 3/2010 | Ernst et al. ................. 705/31 |

OTHER PUBLICATIONS

Profit-Sharing Plan and Money Purchase Pension Plan Single Distribution Request © 2007 The Vanguard Group, Inc. Dec. 2007.*

(Continued)

*Primary Examiner* — William Rankins
(74) *Attorney, Agent, or Firm* — Kilpatrick Townsend & Stockton LLP

(57) ABSTRACT

A self-service distribution system and method to request a withdrawal of funds from tax-deferred accounts (i.e., a distribution), such as individual retirement accounts (IRAs). The system may retrieve information about a participant's age and type of account from which a distribution is requested. A series of checks defined by rules and regulations that apply to tax-deferred accounts may be run against participant and account information retrieved by the system. A sequence of user interfaces may present information and warnings, such as tax consequences of the distribution, to the guide the participant. The participant may request distributions having a certain frequency, amount, and timing through the presented user interfaces. After all of the information is entered to initiate the distribution, a verification page is presented such that the participant may confirm the enter information is correct. Upon submitting the request, a confirmation is presented.

20 Claims, 11 Drawing Sheets

(56) References Cited

OTHER PUBLICATIONS

Retirement Solutions Qualified Domestic Relations Order (QDRO) Employer's Administrative Manual Sep. 2008.*

Gupta, Atul et al.: "E*Trade Financial Services", Journal of Business Case Stuidies, vol. 4, No. 2, Feb. 2008, pp. 1-18.

Schneider, Daniel et al.: "New Savings from Old Innovations: Asset Building for the Less Affluent", Preliminary Draft, Mar. 15, 2005, 71 pages.

* cited by examiner

| File Edit View Actions Help | | | | | | |
|---|---|---|---|---|---|---|
| My Accounts | Products | Advice | Search | My Documents | My Offers | Forms |
| Payment | Transfers | My Profile | | | | |

From Account  [Brokerage – Roth IRA ▸]

To Account  Add an Account

Withdrawal Code  [ ▸ ]

Type of Withdrawal  One-Time

Requested Withdrawal Date  [12/04/2008]
MM/DD/YYYY

Amount  [ $ ]

Withdraw all funds?  ○ Yes  ○ No

[Previous]  [Cancel]  [Next]

File Edit View Actions Help     Fri 3:40 PM

| My Accounts | Products | Advice | Search | | |
|---|---|---|---|---|---|
| Payment | Transfers | My Profile | My Documents | My Offers | Forms |

From Account    Brokerage – Roth IRA

To Account    Add an Account

Type of Withdrawal    One-Time

Requested Withdrawal Date    12/04/2008    MM/DD/YYYY

602 → Generally, we must would hold the federal income tax a rate of 10% of the taxable portion of the withdrawal, and if you give in a state that require state income tax withholding, at your states set rate. You may also incur penalties under the estimated tax rules if you withholding and estimated tax payments are not sufficient. Your automatic holding election will remain in effect until you revoke it. Please print a copy of this page for your records.

Tax withholding options    ⊙ Withhold Taxes    ○ Do Not Withhold Taxes

Amount    $ [    ]

[ Previous ]    [ Cancel ]    [ Next ]

| File Edit View Actions Help | | | | | | Fri 3:40 PM |
|---|---|---|---|---|---|---|
| My Accounts | Products | Advice | Search | | | |
| Payment | Transfers | My Profile | My Documents | My Offers | Forms | |

Tax Withholding

Is the requested amount?    ● Before Taxes
　　　　　　　　　　　　　○ After Taxes

Amount                $ [2000]

Federal Tax           [10] % = $200.00
                      Minimum 10% and $10

State Tax             [10] % = $200.00
                      Minimum 10% and $10

Total taxes to withhold    $400.00
Total you will receive     $1,600.00
Total withdrawal           $2,000.00

[Previous]                [Cancel]    [Next]

SYSTEMS AND METHODS FOR ADMINISTERING SELF-SERVICE MUTUAL FUND AND IRA DISTRIBUTIONS TO PARTICIPANTS

BACKGROUND

The rules for distributions from Individual Retirement Accounts (IRA) and other tax-deferred accounts are very complicated. Regulations require that distributions begin at age 70Y2. Distributions may be taxable as ordinary income and are subject to a 10% early withdrawal penalty if the participant is under age 59%, unless an exception applies. A participant can withdraw money (i.e., take a distribution) from an IRA at any time, unless there is a reason why the participant cannot withdraw money, such as if there is an order of a divorce court.

Typically, to initiate a distribution, the participant fills-out a paper document that is mailed into a central processing facility to request the distribution. Participants may also contact a call center to speak with an advisor to conduct the transaction. However, there is not a process by which the participant can initiate a distribution using a self-service mechanism, such a website, where the participant can review information and make decisions regarding the distribution at his/her leisure, and have the distribution immediately queued for processing by a financial institution.

SUMMARY

A self-service distribution system and method to request a withdrawal of funds from tax-deferred accounts (i.e., a distribution), such as individual retirement accounts (IRAs). The system may retrieve information about a participant's age and type of account from which a distribution is requested. A series of checks defined by rules and regulations that apply to tax-deferred accounts may be run against participant and account information retrieved by the system. A sequence of user interfaces may present information and warnings, such as tax consequences of the distribution, to the guide the participant. The participant may request distributions having a certain frequency, amount, and timing through the presented user interfaces. After all of the information is entered to initiate the distribution, a verification page is presented such that the participant may confirm the enter information is correct. Upon submitting the request, a confirmation is presented.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIGS. 3-8 illustrate exemplary user interfaces by which a customer may request a self-service distribution from a tax-deferred account.

DETAILED DESCRIPTION

Figure 1:
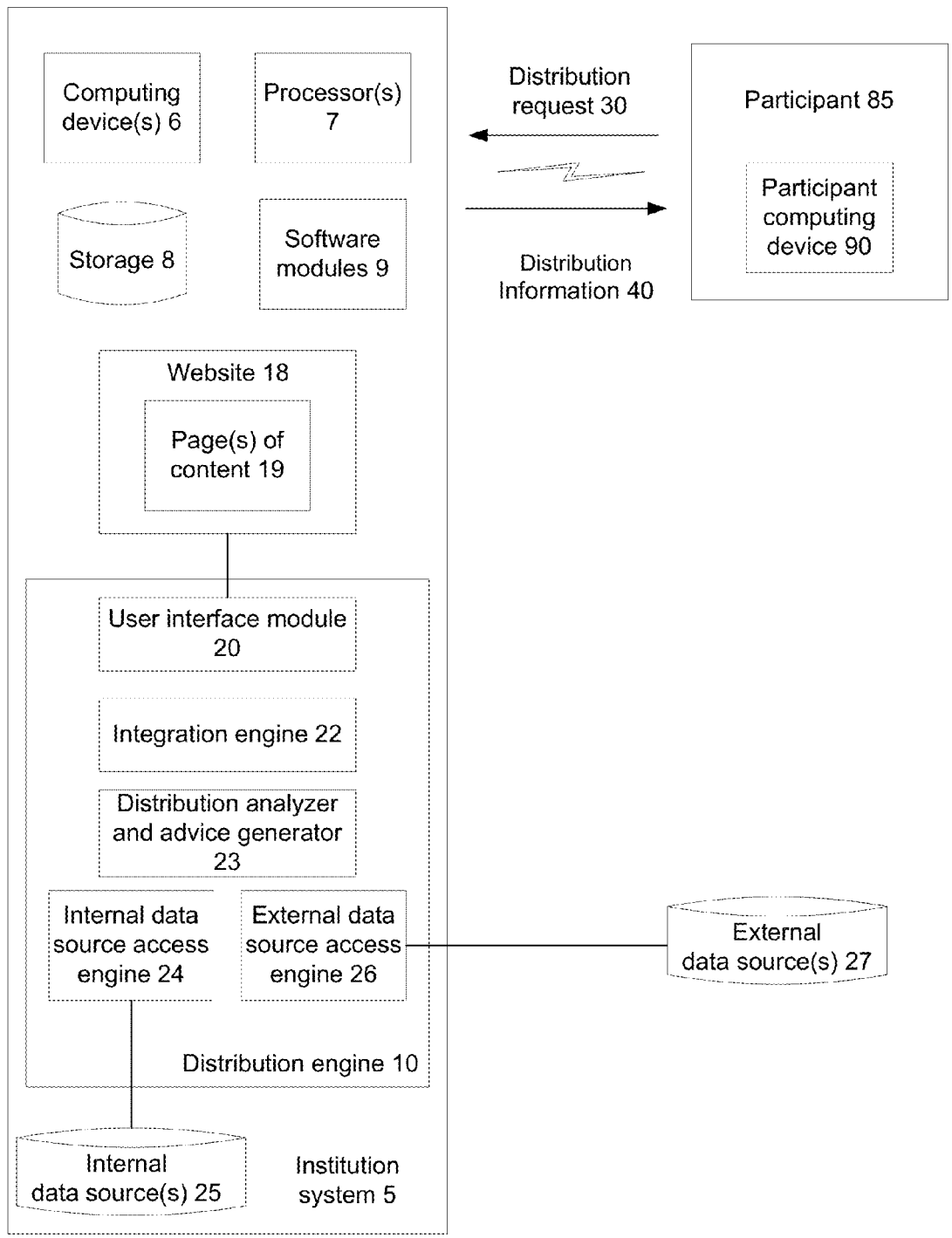
FIG. 1 is a block diagram of an implementation of a system that may be used to provide self-service IRA and other tax-deferred distributions.

FIG. 1 is a block diagram of an implementation of a system that may be used to provide self-service IRA, 401(k) and other tax-deferred distributions. As used herein, the terms withdrawal and distribution have the same meaning. When a participant 85 takes a withdrawal, the participant 85 receives a distribution. An institution system 5, associated with or otherwise maintained by an institution such as a financial services institution, may include a distribution engine 10. The distribution engine 10 may receive a distribution request 30 from the participant 85 via a participant computing device 90, and may provide distribution information 40, comprising financial advice and/or recommendations for example, to the participant 85 via the participant computing device 90 regarding obtaining a distribution from IRA, 401(k) and other tax-deferred accounts. An example participant computing device 90 is described with respect to FIG. 9.

The distribution engine 10 may include a user interface module 20, an integration engine 22, a distribution analyzer and advice generator 23, an internal data source access engine 24, and an external data source access engine 26. The user interface module 20 may generate and format one or more pages of content 19 as a graphical presentation that may be provided to the participant computing device 90 as an output from the distribution engine 10. The page(s) of content 19 may be provided to the participant computing device 90 via a website 18 associated with the institution system 5.

The integration engine 22 provides the distribution engine 10 the ability to retrieve information from one or more internal data sources 25 and one or more external data sources 27 concurrently, in an implementation, via an internal data source access engine 24 and an external data source access engine 26, respectively. Data pertaining to the participant 85 may be retrieved from internal source(s) 25 as well as external data source(s) 27. The retrieved data may be stored centrally, perhaps in storage associated with the institution system 5, such as storage 8.

Internal data source(s) 25 may contain data that the institution system 5 maintains pertaining to the participant 85, such as personal data such as marital status and age, as well as financial data such as account balances, outstanding loans, credit card debt, etc. For instance, the participant 85 may have an IRA account, 401(k) account, or other tax-deferred account with the institution system 5, and this information may be retrieved and used by the distribution engine 10.

External data source(s) 27 may contain additional data pertaining to the user, such as additional personal data and/or financial data. External data source(s) 27 may be associated with one or more entities that may be independent of each other. Each of the external data source(s) 27 may be a computer system that maintains financial information or financial accounts of the participant 85 that is not maintained by the institution system 5. It is contemplated that any number of external data sources may be in communication with the institution system 5 and may provide any type of data associated with users thereto.

In an implementation, external data source(s) 27 may include credit cards, financial institutions, financial software applications, and public databases. The external data source(s) 27 may be in communication with the institution system 5 via a network, such as the Internet. Additional example sources of data may include bank accounts, retirement accounts, financial software applications, brokerage accounts, mutual funds, annuities, certificates of deposits, and investment accounts, for example, along with publicly available information. For example, data from investment and retirement accounts might include mutual funds, bonds, etc. and may be acquired and used in subsequent calculations and analysis.

The integration engine 22 may receive user information from the internal and external data source access engines 24 and 26 and may provide that information to the distribution analyzer and advice generator 23. The distribution analyzer and advice generator 23 may use tools, calculators, applications, and aggregators, for example to generate distribution information 40. In an implementation, the distribution analyzer and advice generator 23 may include one or more of a portfolio planner, a financial assessment tool, a budget generating tool, an asset allocation tool, a life insurance determination calculator, a retirement advice generator, bank calculators, debt analyzers, retirement income planners, etc. The distribution analyzer and advice generator 23 may evaluate the user information (e.g., the personal information and the financial information pertaining to the user) and generate distribution information 40 that may comprise information regarding distributions from an IRA account, 401(k) account, or other tax-deferred account for the participant 85.

In an implementation, the distribution information 40, may be integrated into a single unified presentation, which may then be sent to the user interface module 20 for presentation to the participant 85. Examples are described below with reference to FIGS. 3-8. Through this mechanism, the participant 85 may quickly see the distribution information 40. Thus, in an implementation, distribution information 40 may be provided online, e.g. via the website 18, to the participant 85.

The participant 85 may interface with the institution system 5 via the website 18 that may display one or more pages of content 19 to the participant 85 on the participant computing device 90. A distribution request 30 may be received at the institution system 5 through any suitable means, such as interaction with a web browser that is in communication with a financial advice server or other computing device within the institution system 5. The actual mechanism of connection is outside the scope of the present discussion.

The distribution request 30 may be processed by the distribution engine 10, which then provides the participant 85 with the distribution information 40. In an implementation, the participant 85 may be provided with advice, recommendations and/or a plan directed to asset management, estate planning, insurance, investments, and retirement, for example. The distribution information 40 may comprise a set of recommendations, strategies, warnings, tax information, etc. for the participant 85 to use and evaluate when requesting a distribution.

The distribution engine 10 may implement processes to enable self-service tax-deferred account distributions that comply with the complex regulations that govern such accounts. For example, when processing a distribution request, the distribution engine 10 may perform initial checks to determine whether the distribution from the tax-deferred account should proceed. For example, the distribution engine 10 may limit on-line requests through the website 18 to only primary owners of an IRA accounts. The distribution engine 10 may disallow distributions from accounts having certain restriction codes (e.g., the account owner is deceased, a divorce is pending between the account owner and a spouse, the account owner is disabled, account is closed) or from accounts having freeze codes.

If the process proceeds, and a distribution is allowed, certain checks may be made by the distribution engine 10 regarding the distribution. The distribution engine 10 may determine a distribution type based on the customer's age at the time of submission of the distribution request 30. The distribution type may be considered premature if the participant 85 is less than to 59½ years of age or normal if customer is 59½ years of age or older. The distribution engine 10 may display tax-related disclaimers to participants under 59½ (e.g., a 10% tax penalty may apply). A funds available for withdrawal rule may be applied, which prohibits the participant 85 from exceeding a predetermined amount on a one-time, future dated and recurring transactions. The distribution engine 10 may also calculate required minimum distributions (RMD) that may be updated annually and may account for any external accounts held by the participant 85.

The distribution engine 10 may disallow recurring distributions for participants 85 who are younger than 59½ years of age. Where recurring distributions are allowed, the participant 85 may be required to enter a distribution frequency (e.g., weekly, 1st and 15th of each month, every two weeks, monthly, every two months). The distribution engine 10 may apply certain distributions restrictions for participants 85 who are younger than 59½ years of age (e.g., a SIMPLE IRA that has been opened for less than 2 years).

In addition to checking age and characteristics of the distribution, the distribution engine 10 may perform checks against the amount requested to be transferred as part of the distribution. For example, the distribution engine 10 may require the distribution amount to be a multiple of $100, or may provide an option for a full liquidation.

The distribution engine 10 may determine if taxes are required to be withheld from the distribution to the participant 85. For example, certain states may require state taxes to be withheld. In some instances, the participant 85 may voluntarily select to have the federal and/or state taxes withheld. In yet other circumstances, there may be a state requirement that if federal taxes are withheld, then state taxes must also be withheld. In addition, certain types of tax-deferred accounts do not require federal tax withholdings, such as a Roth IRA. As such, tax withholding processes may be skipped by the distribution engine 10.

In some implementations, the distribution engine 10 may validate parameters associated with the "from account" and the "to account" associated with the distribution request. For example, certain minimum (e.g., greater than or equal to $100) and maximum (e.g., available cash balance) amount limits may be applied based on the type of account from which the distribution will be made and the account to which the distribution will be deposited. Daily amount limits may apply to such transfers as well (e.g. only one transfer per day). The distribution engine 10 may determine if the "to account" is eligible to receive the distribution requested by the participant 85. Many variations of the checks performed by the distribution engine 10 are possible and considered to be within the scope and spirit of the present disclosure.

In some implementations, the distribution engine 10 may cause the user interface module 20 to prepare a page of content 19 to verify the information entered by the participant 85 as part of the distribution request 30. A verification page may be presented to the participant 85 by the website 18. The verification page may present the information entered by the participant 85 with regard to the distribution, and present a mechanism by which the participant 85 may edit any of the data items previously entered during the distribution request 30. A confirmation page may follow once the participant 85 has verified that the information entered in the distribution request 30 is correct. The distribution engine 10 may cause the user interface module 20 prepare a page of content 19 that informs the participant 85 of what happens next after the distribution request 30 is confirmed. For example, the participant 85 may notified about timing of the distribution, whether the distribution can be canceled (e.g., by midnight of the same day), etc.

The participant computing device 90 may provide user access to a system that is coupled to the distribution engine 10 and is configured to receive a plurality of user requests, at least one of which is a distribution request 30. A system may be configured to format and transmit a graphical user interface to participant 85, and through the graphical user interface provide the participant 85 the ability to interact with and manipulate the financial advice, recommendations, and/or financial plan provided by the institution system 5 (e.g., draw down strategies).

A user access system may be communicatively coupled to the distribution engine 10 and may be configured to send machine-readable instructions to the distribution engine 10. Those instructions may cause the distribution engine 10 to access one or more internal and one or more external data sources 25 and 27, respectively.

As mentioned above, the distribution engine 10 may provide a graphical presentation output. The graphical presentation may be transmitted to the user access system. In an implementation, the graphical presentation is combined with other materials and transmitted to the participant 85. In an implementation, the graphical presentation is received by the user access system and transmitted directly to the participant 85 without the inclusion of any other materials.

The user access system may be implemented as a web server in an implementation. The user access system, through the use of any suitable interactive web technology, provides an interactive experience to the participant 85 through which access to and maintenance of their financial advice, recommendations, and/or financial plan can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

In an implementation, the institution may be a financial services institution having a financial services website. On the website, in a common space, the user may be presented with financial advice, recommendations, and/or a financial plan.

The institution system 5 may comprise one or more computing devices 6. A participant computing device 90 may allow a participant 85 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the participant 85 may be stored in storage 8 or other storage such as one or more internal data sources 25, for example.

Examples of software modules 9 may include modules for identifying and authenticating a user, generating a questionnaire, generating web page content for display, and receiving instructions from a user, described further herein. While specific functionality is described herein as occurring with respect to specific modules, the functionality may likewise be performed by more, fewer, or other modules. The functionality may be distributed among more than one module. An example computing device and its components are described in more detail with respect to FIG. 9.

The institution system 5 may include a messaging component as one of the software modules 9 to communicate with participants 85 to remind them of events, provide guidance, provide status, and to make recommendations. For example, an e-mail may be sent to remind the participant 85 to take a RMD. Guidance may be provided regarding rules changes along with recommendations regarding such changes.

Figure 2A:
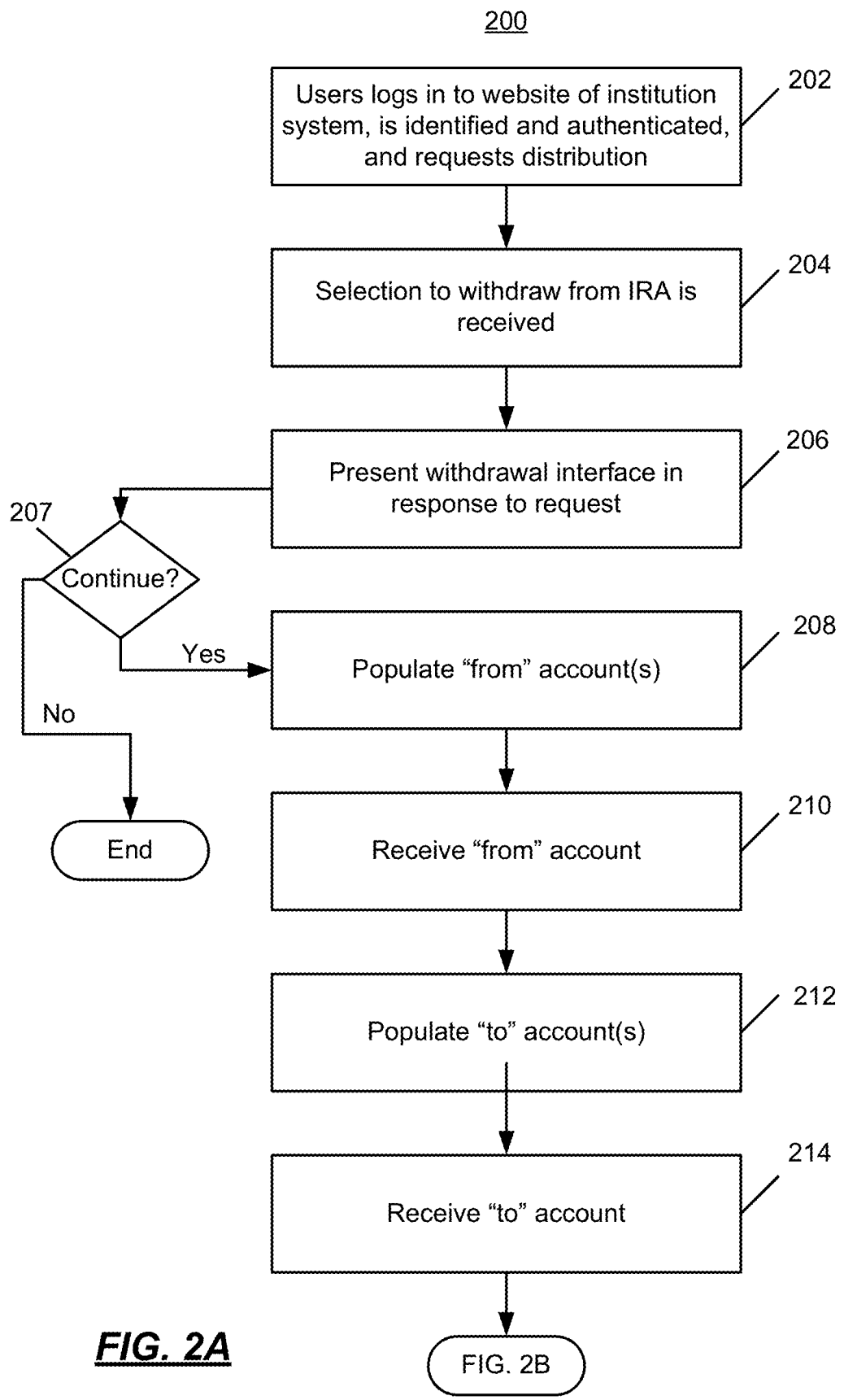
FIGS. 2A-2C illustrate an operational flow of an implementation of a method of electronically receiving and processing self-service distributions.
Figure 2B:
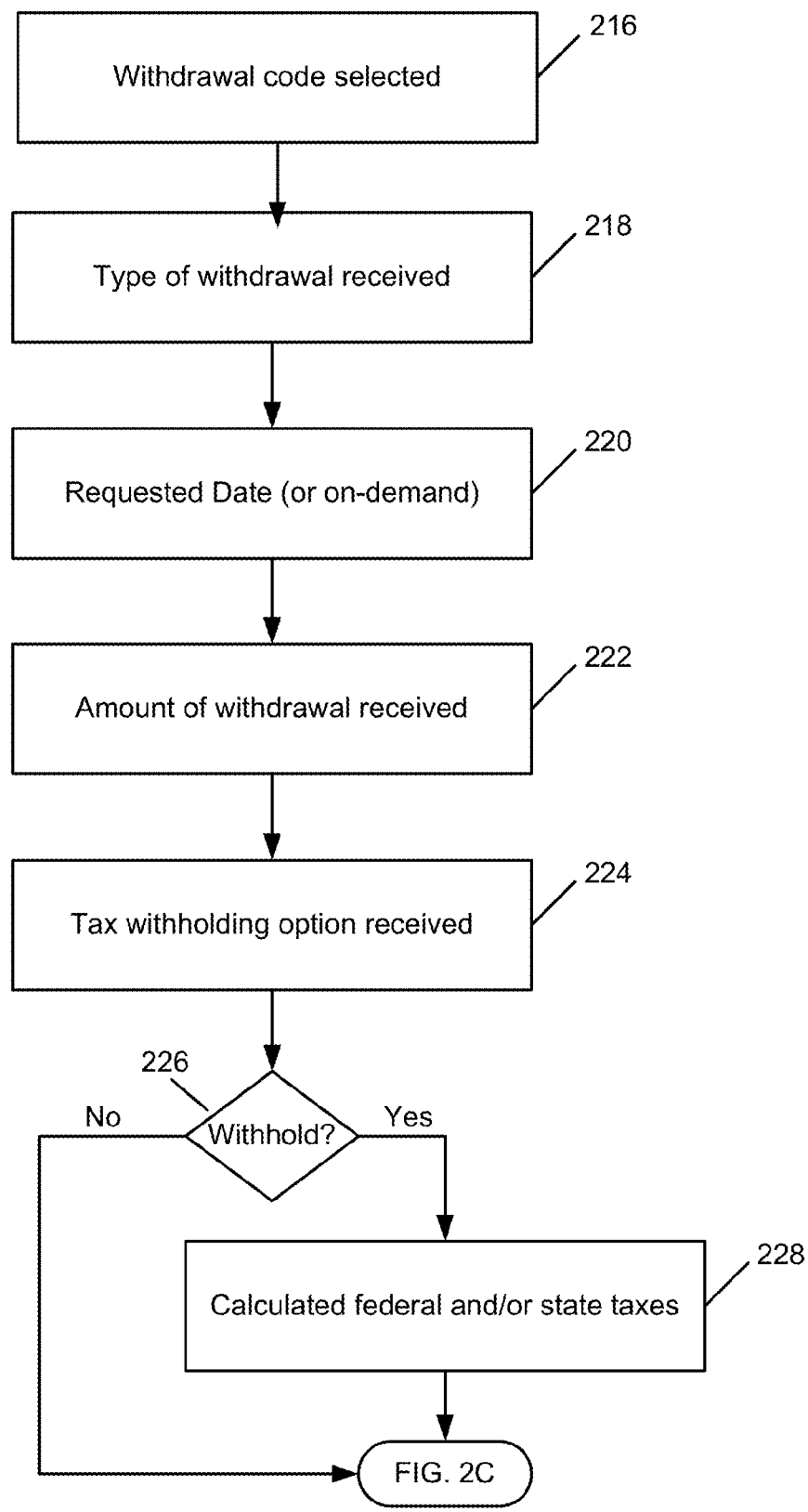
Figure 2C:
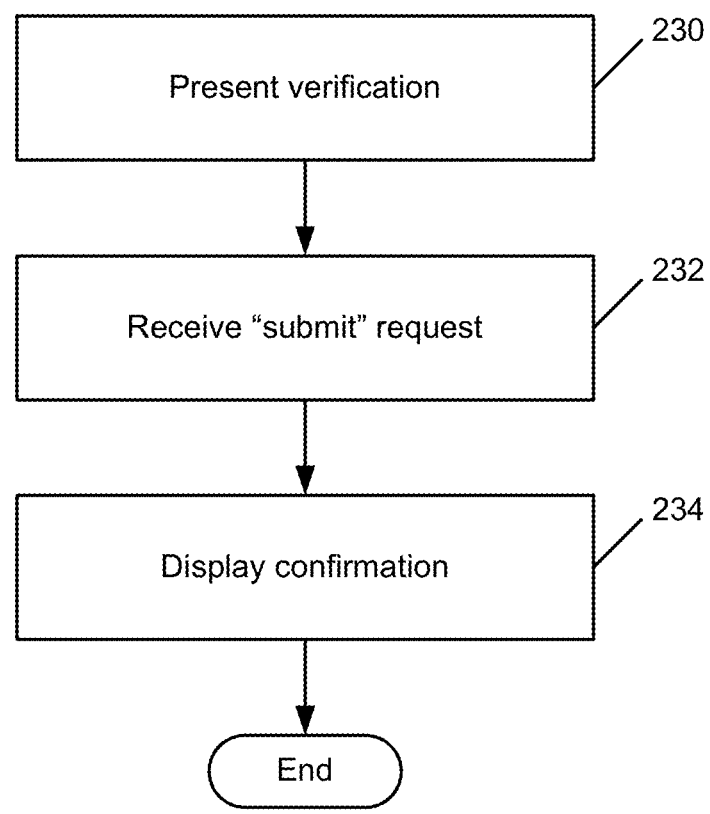
Figure 3:
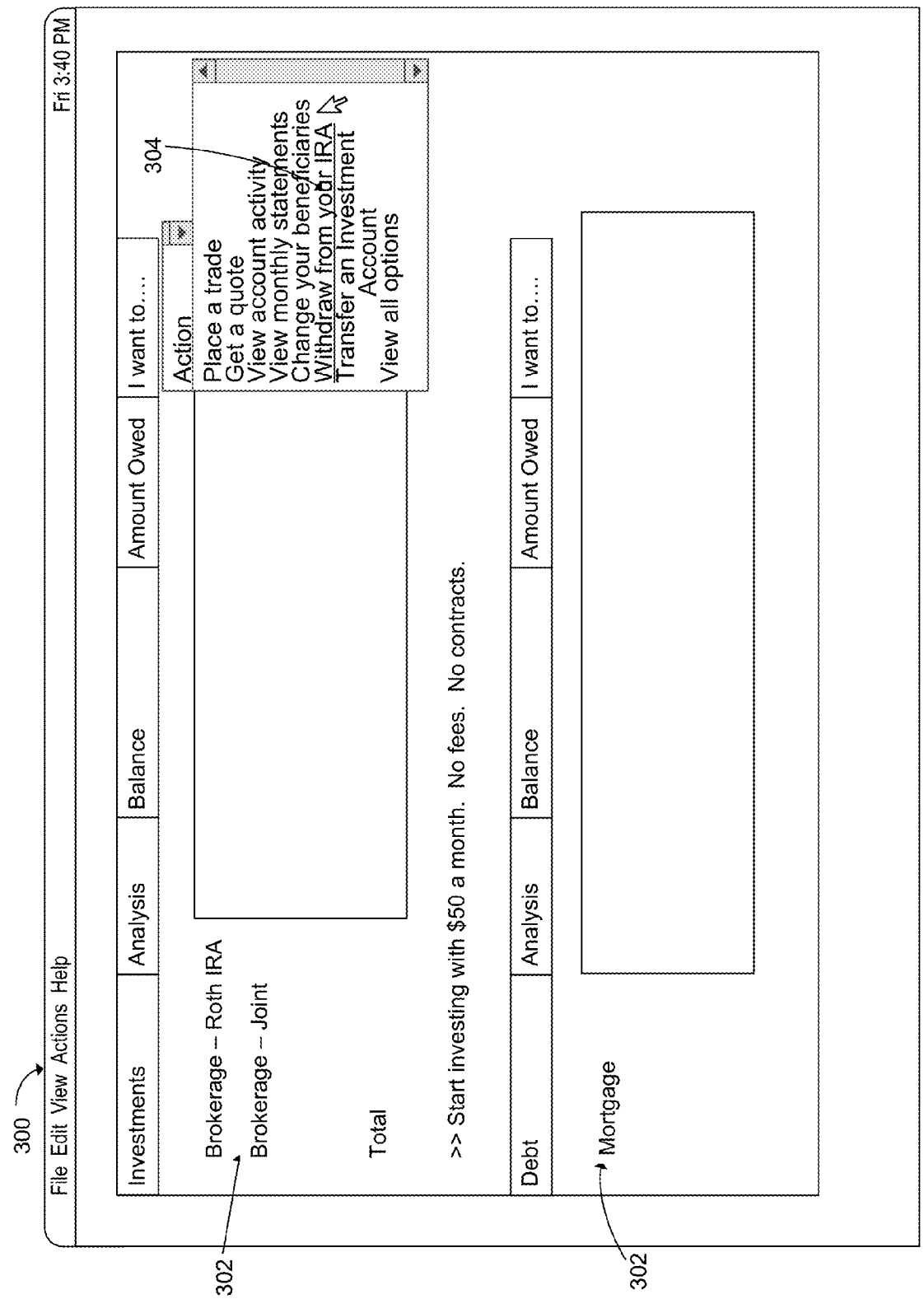
Figure 4:
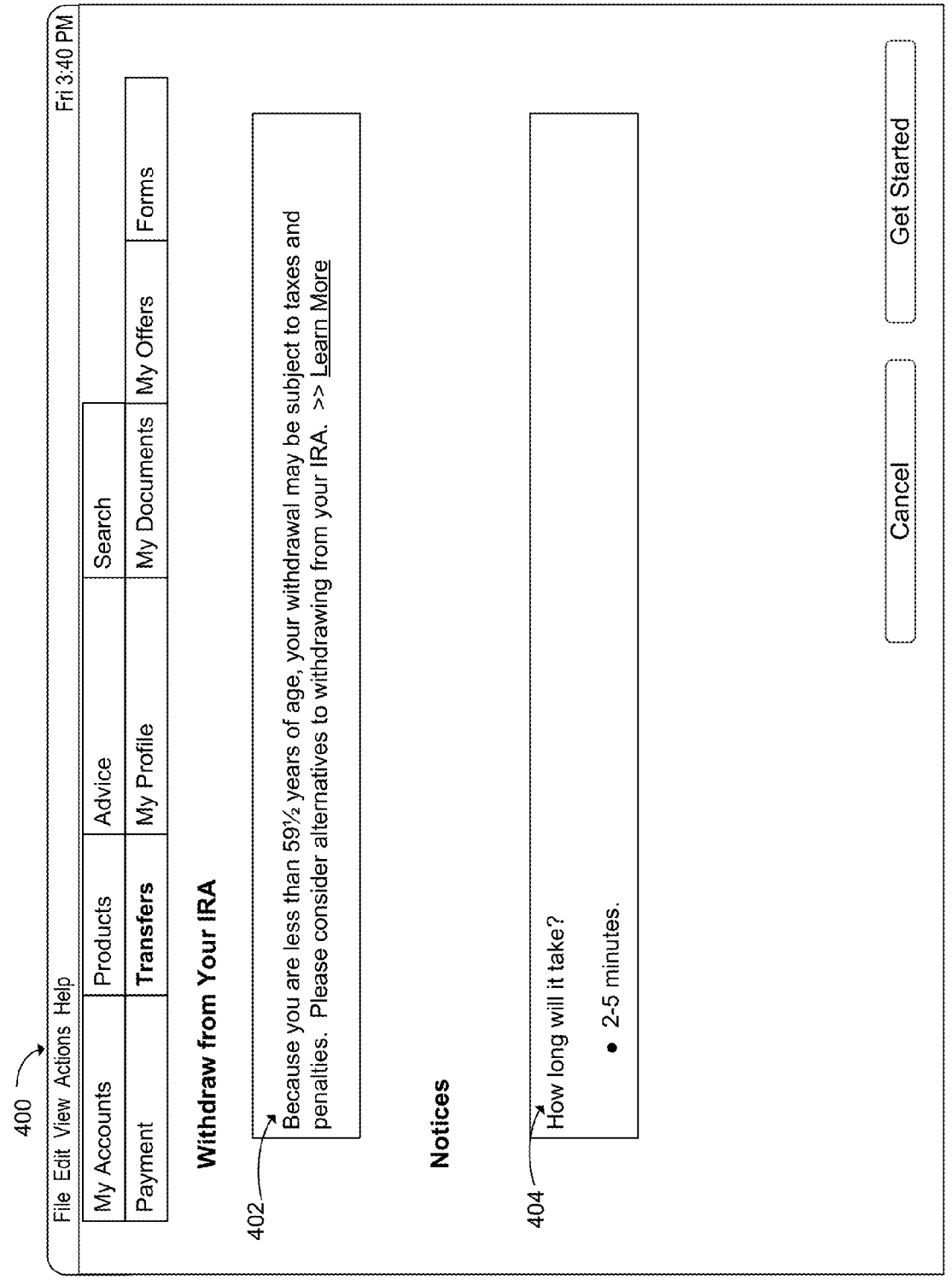
Figure 8:

FIGS. 2A-2C illustrate an operational flow of an implementation of a method 200 of electronically receiving and processing self-service distributions. FIGS. 3-8 illustrate exemplary user interfaces by which a customer may request a self-service distribution from a tax-deferred account. At 202, a customer may log into a website associated with the institution system, may be identified and authenticated using any known techniques, and may select a distribution entry point. The distribution entry point may be a user interface 300 such as shown in FIG. 3 and may be provided by the website 18 to the participant computing device 90. Account information 302 may be displayed in the user interface 300. The account information may be ascertained from one or more of the internal data sources 25 in the institution system 5. For example, the account information 302 may include a brokerage Roth IRA, or a brokerage joint account as shown in the user interface 300. Additional or fewer tax-deferred accounts of any type may be presented within the user interface 300 based on the holdings of the participant 85.

At 204, a selection to withdraw from an IRA is received. For example, in the user interface 300, an option 304 to "withdrawal from your IRA" may be provided. The participant 85 may select the option 304 to begin the distribution process.

At 206, a withdrawal user interface is presented. The withdrawal user interface 400 (FIG. 4) may be presented in response to the selection of option 304 in the user interface 300. The withdrawal user interface 400 may present information areas 402 and 404 containing information about the action to be taken (withdrawal from the IRA). Information area 402 within the user interface 400 may present information specific to the participant 85. For example, if the participant 85 is less than 59½ years of age, the customer is notified that the withdrawal from the IRA may be subject to taxes and penalties. Participants may also be provided with advice to consider alternatives to withdrawing from the IRA. A link may be provided to the participant 85 to "learn more" about the other alternatives to withdrawing from the IRA. Information area 404 may provide status and other information regarding the distribution. For example, information area 404 may inform the participant about how long the self-service process will take. In addition, the user interface 400 may include a glossary of terms relevant to the user interface 400 to guide the participant 85 through the process. It is noted that any of the user interface described herein may provide a glossary of terms.

At 207 is determined if the participant has chosen to continue. If the participant 85 chooses to continue by selecting the "get started" button, a user interface 500 may be presented at 208. Otherwise, the user may cancel and the process ends.

At 208, the user interface 500 is presented, and the "from" account field is populated with options. At 210 a selection of the "from" account is received. As shown in the user interface 500, the participant 85 has selected the brokerage Roth IRA account as the "from" account. At 212, the "to" account field is populated. This field may be populated with known receiving accounts of funds to be distributed from the tax-deferred "from" accounts. In addition, an account may be added or opened, as shown in the user interface 500 (e.g., "Add and Account"). At 214, a selection of the "to" account is received. Funds may be withdrawn from the "from" account and deposited to the "to" account using an ACH transfer, a mailed check, etc.

At 216, a withdrawal code is selected. The withdrawal code may be an identifier of a type of distribution being taken by the participant 85 from the tax-deferred account. Example withdrawal codes include normal, premature, premature exception, disability, death, etc. At 218, a type of withdrawal is received. The type of withdrawal may be a one-time on demand withdrawal, a recurring withdrawal, or a future one-time withdrawal.

At 220, a requested withdrawal date is received. As shown in the user interface 500, the participant 85 has selected Dec. 4, 2008 for a one-time withdrawal. In this instance, the date is a future one-time withdrawal date. In some implementations where the participant 85 has selected a one-time on demand withdrawal, the requested withdrawal date need not be provided as is assumed to be the present date. In some implementations, when a recurring withdrawal is selected, then the requested withdrawal date may be the first date in the recurrence pattern (e.g., the first of the month, the 15th of the month, the beginning of a week, etc.).

At 222, an amount is received. The amount may be a dollar amount specified within a maximum and minimum amount for the distribution. In some implementations, a radio button may be provided to withdrawal funds. The input amount will be withdrawn from the "from" account at the close of the trading day. In some implementations, a number of shares may be specified. Here, the amount to be withdrawn would be equal to the number of shares times the closing price of the fund or stock being sold.

At 224, a tax withholding option may be received. In some implementations, the user interface 600 (FIG. 6) may be presented as an alternative, or in addition to, the user interface 500 in accordance with tax requirements. Such tax requirements may vary from state to state, as some states require taxes to be withheld, where others make it optional or not required. For example as shown in the user interface 600, a display area 602 may provide guidance to the participant 85 that federal income tax should be withheld, and certain guidance if the income taxes are not withheld from the distribution.

At 226, it is determined if the participant 85 has chosen to withhold taxes from the distribution (or if it is required). If so, then at 228, an amount of taxes to be withheld and the amount of the distribution are calculated. For example, a user interface 700 (FIG. 7) may be presented to request if the participant 85 would like an amount withheld before or after taxes, and what percentage the participant 85 would like to be withheld. The tax liability and an amount that the customer will receive are also shown in the user interface 700.

At 230, a verification is presented. The verification may be presented as a user interface 800 where information previously entered is displayed so the participant 85 may review and edit information for accuracy, if necessary. At 232, a "submit" action is received, and at 234, a confirmation is provided that the transaction has been completed.

Thus, as described above, a financial institution through its institution system 5 and distribution engine 10 may provide a website 18 to participants 85 interested in requesting a distribution through a self-service mechanism. The self-service mechanism may provide error checking, advice, information and warnings to the participant regarding the requested distribution. As a result, the participant may request a distribution without having to fill out a form or calling an adviser during regular business hours.

Table 1 below provides several exemplary scenarios by which a customer may interface with the institution system to request a self-service distribution from a tax-deferred account. The exemplary scenarios are provided really for illustrative purposes and should not be considered to limit the scope of the present disclosure.

| Scenario Name | Description | Flow |
| --- | --- | --- |
| Transfer funds from Checking to Brokerage Asset Management Account (AMA) account via Portal. Transaction type: On-Demand (OD) | Perform Transfer funds from Checking Account to Brokerage AMA from Customer Relationship Management (CRM) Portal. Check the Transfer activity and Transfer details as expected. | 1. Log in into Portal<br>2. Search for the Customer and Press Continue<br>3. Click on Products Tab.<br>4. Select "Transfer Funds" option from "Take Action Drop Down"<br>5. Enter Transfer Funds data as required.<br>6. Click on Submit Button.<br>7. Verify Confirmation Details.<br>8. Click on View Transfer Activity Link.<br>9. Verify Activity details.<br>10. Click on details link for the transaction.<br>11. Verify the execution details on "Transfer details" page: |
| Transfer funds from Brokerage Non IRA to Mutual Fund (MF) non IRA account via Portal. Transaction type: Recurring (AUTO) | Perform Transfer funds from Brokerage non IRA Account to MF non IRA from CRMPortal. Check the Transfer activity and Transfer details as expected. | 1. Log in to Portal<br>2. Search for Customer by number and press Continue<br>3. Click on the "Products" tab<br>4. Select "Transfer Funds" option from "Take Action" drop down list<br>5. Enter Transfer Funds data as required<br>6. Click on Continue<br>7. Verify transfer details<br>8. Click on Submit<br>9. View Confirmation page<br>10. Click on "Transfer Activity" link<br>11. Click on "Details" link<br>12. Verify transfer details |

-continued

| Scenario Name | Description | Flow |
|---|---|---|
| Transfer funds from External to Brokerage IRA account via Portal. Transaction type: OD | Perform Transfer funds from External Account to Brokerage IRA from CRMPortal. Check the Transfer activity and Transfer details as expected. | 1. Log in to Portal<br>2. Search for Customer by number and press Continue<br>3. Click on the "Products" tab<br>4. Select "Transfer Funds" option from "Take Action" drop down list<br>5. Enter Transfer Funds data as required<br>6. Click on Continue<br>7. Verify transfer details<br>8. Click on Submit<br>9. View Confirmation page<br>10. Click on "Transfer Activity" link<br>11. Click on "Details" link<br>12. Verify transfer details |
| Transfer funds from FSB to MF IRA account via Portal.Transaction type: Future Dated (FD) | Perform Transfer funds from FSB Account to MF IRA from CRMPortal. Check the Transfer activity and Transfer details as expected. | 1. Log in to Portal<br>2. Search for Customer by number and press Continue<br>3. Click on the "Products" tab<br>4. Select "Transfer Funds" option from "Take Action" drop down list<br>5. Enter Transfer Funds data as required<br>6. Click on Continue<br>7. Verify transfer details<br>8. Click on Submit<br>9. View Confirmation page<br>10. Click on "Transfer Activity" link<br>11. Click on "Details" link<br>12. Verify transfer details |
| Transfer funds from MF Non IRA to External account via Mobile. Transaction type: OD | Perform Transfer funds from Mutual Fund Non IRA account to External account from Mobile website. Check the Transfer Activity and Transfer details as expected | 1. Log into Mobile website<br>2. Select "Transfer Funds" option in the main menu<br>3. Enter PIN number<br>4. Select the "From" account from the drop down list<br>5. Select the "To" account from the drop down list<br>6. Enter the "Amount" to transfer<br>7. Select the date on which the transfer should occur<br>8. Click the "Next" button<br>9. Verify the transfer details<br>10. Click the "Submit" button<br>11. Verify the transfer details on the confirmation page |
| Transfer funds from FSB to Brokerage non-IRA account via Mobile. Transaction type: FD | Perform Transfer funds from FSB account to Brokerage account from Mobile website. Check the Transfer Activity and Transfer details as expected | 1. Log into Mobile website<br>2. Select "Transfer Funds" option in the main menu<br>3. Enter PIN number<br>4. Select the "From" account from the drop down list<br>5. Select the "To" account from the drop down list<br>6. Enter the "Amount" to transfer<br>7. Select the date on which the transfer should occur<br>8. Click the "Next" button<br>9. Verify the transfer details<br>10. Click the "Submit" button<br>11. Verify the transfer details on the confirmation page |
| Transfer funds from FSB to MF IRA account via Mobile. Transaction type: OD | Perform Transfer funds from FSB account to MF IRA account from Mobile website. Check the Transfer Activity and Transfer details as expected | 1. Log into Mobile website<br>2. Select "Transfer Funds" option in the main menu<br>3. Enter PIN number<br>4. Select the "From" account from the drop down list<br>5. Select the "To" account from the drop down list<br>6. Enter the "Amount" to transfer<br>7. Select the date on which the transfer should occur<br>8. Click the "Next" button<br>9. Verify the transfer details<br>10. Click the "Submit" button<br>11. Verify the transfer details on the confirmation page |
| Transfer funds from External to Brokerage IRA account via Mobile. Transaction type: AUTO | Perform Transfer funds from External account to Brokerage IRA account from Mobile website. Check the Transfer Activity and Transfer details as expected | 1. Log into Mobile website<br>2. Select "Transfer Funds" option in the main menu<br>3. Enter PIN number<br>4. Select the "From" account from the drop down list<br>5. Select the "To" account from the drop down list<br>6. Enter the "Amount" to transfer |

-continued

| Scenario Name | Description | Flow |
|---|---|---|
| | | 7. Select the date on which the transfer should occur<br>8. Click the "Next" button<br>9. Verify the transfer details<br>10. Click the "Submit" button<br>11. Verify the transfer details on the confirmation page |
| Transfer funds from Brokerage AMA to FSB account via Dotcom. Transaction type: AUTO | Perform Transfer funds from Brokerage AMA account to FSB IRA account from financial provider website.<br>Check the Transfer Activity and Transfer details as expected | 1. Log into Dotcom site<br>2. Select "Transfer Funds" from any entry point<br>3. Select the "From" account from the drop down list<br>4. Select the "To" account from the drop down list<br>5. Enter the Amount to transfer<br>6. For Transfer type select "One-Time Transfer" or "Automatic Transfer"<br>7. For automatic transfers select the "Frequency" from the drop down list and select the start and end date<br>8. For one-time transfer select the "Requested Transfer Date"<br>9. Enter the Amount to be transferred<br>10. Click on "Next"<br>11. Verify the transfer details<br>12. Select the "Transfer Funds" button<br>13. View the Transfer details page |
| Transfer funds from USB to MF non IRA account via Dotcom. Transaction type: OD | Perform Transfer funds from USB account to MF non IRA account from financial provider website.<br>Check the Transfer Activity and Transfer details as expected | 1. Log into Dotcom site<br>2. Select "Transfer Funds" from any entry point<br>3. Select the "From" account from the drop down list<br>4. Select the "To" account from the drop down list<br>5. Enter the Amount to transfer<br>6. For Transfer type select "One-Time Transfer" or "Automatic Transfer"<br>7. For automatic transfers select the "Frequency" from the drop down list and select the start and end date<br>8. For one-time transfer select the "Requested Transfer Date"<br>9. Enter the Amount to be transferred<br>10. Click on "Next"<br>11. Verify the transfer details<br>12. Select the "Transfer Funds" button<br>13. View the Transfer details page |
| Transfer funds from External to MF IRA account via Dotcom. Transaction type: FD | Perform Transfer funds from External account to MF IRA account from financial provider website.<br>Check the Transfer Activity and Transfer details as expected | 1. Log into Dotcom site<br>2. Select "Transfer Funds" from any entry point<br>3. Select the "From" account from the drop down list<br>4. Select the "To" account from the drop down list<br>5. Enter the Amount to transfer<br>6. For Transfer type select "One-Time Transfer" or "Automatic Transfer"<br>7. For automatic transfers select the "Frequency" from the drop down list and select the start and end date<br>8. For one-time transfer select the "Requested Transfer Date"<br>9. Enter the Amount to be transferred<br>10. Click on "Next"<br>11. Verify the transfer details<br>12. Select the "Transfer Funds" button<br>13. View the Transfer details page |
| Transfer funds from MF non IRA to Brokerage IRA account via Dotcom. Transaction type: OD | Perform Transfer funds from MF non IRA account to Brokerage IRA account from financial provider website.<br>Check the Transfer Activity and Transfer details as expected | 1. Log into Dotcom site<br>2. Select "Transfer Funds" from any entry point<br>3. Select the "From" account from the drop down list<br>4. Select the "To" account from the drop down list<br>5. Enter the Amount to transfer<br>6. For Transfer type select "One-Time Transfer" or "Automatic Transfer"<br>7. For automatic transfers select the "Frequency" from the drop down list and select the start and end date<br>8. For one-time transfer select the "Requested Transfer Date"<br>9. Enter the Amount to be transferred |

-continued

| Scenario Name | Description | Flow |
|---|---|---|
| | | 10. Click on "Next"<br>11. Verify the transfer details<br>12. Select the "Transfer Funds" button<br>13. View the Transfer details page |

Figure 9:
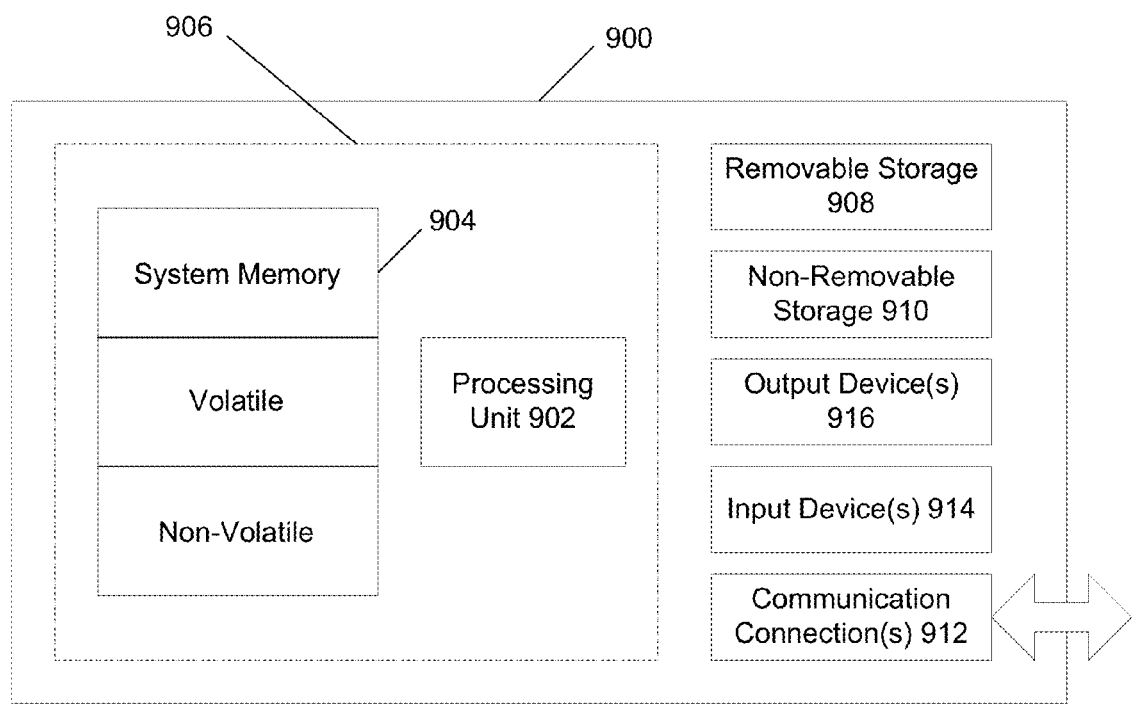
FIG. 9 is a block diagram of an example computing environment in which example embodiments and aspects may be implemented.

FIG. 9 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and system memory 904. Depending on the exact configuration and type of computing device, system memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features and/or functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer-readable media. Computer-readable media can be any available media that can be accessed by computing device 900 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 904, removable storage 908, and non-removable storage 910 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may also contain communication connection(s) 912 that allow the computing device 900 to communicate with other devices. Communication connection(s) 912 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

Computing device 900 may be one of a plurality of computing devices 900 inter-connected by a network. As may be appreciated, the network may be any appropriate network, each computing device 900 may be connected thereto by way of communication connection(s) 912 in any appropriate manner, and each computing device 900 may communicate with one or more of the other computing devices 900 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for a portal from which a self-service distribution from a tax-deferred account is initiated, the system comprising:
   a processor;
   a computer-readable medium coupled to the processor and storing a plurality of instructions, the processor configured to;
   authenticate a participant to which the self-service distribution is to be made;
   provide a series of user interfaces to guide the self-service distribution;
   provide a financial plan including draw down strategies;
   receive information regarding an account to which the distribution is to be deposited;
   determine a distribution type and distribution code;
   determine if taxes are to be withheld from the distribution;
   provide the distribution to the participant; instructions that cause the processor to determine if a tax-deferred account related to the participant has been opened longer than a predetermined period of time;
   disallow the distribution if the tax-deferred account has not been opened for the predetermined period of time; and
   process a distribution request from the participant based at least in part on determining if a restriction code is applied to the tax-deferred account, wherein the restriction code disallows distributions from the tax-deferred account to the participant.

2. The system of claim 1, further comprising instructions that cause the processor to determine if taxes are to be withheld based on a customer record associated with the participant, the customer record including a state of residence.

3. The system of claim 1, further comprising instructions that cause the processor to apply a penalty if the participant is less than a predetermined age.

4. The system of claim 1, further comprising instructions that cause the processor to provide a warning to the participant of adverse tax consequences of the distribution.

5. The system of claim 4, further comprising instructions that cause the processor to suggest a tax efficient alternative to the distribution to the participant.

6. The system of claim 4, further comprising instructions that cause the processor to determine if a mandatory distribution is required to be made to the participant.

7. The system of claim 1, further comprising instructions that cause the processor to provide a link that displays other funding alternatives to withdrawing from the tax-deferred account.

8. The system of claim 1, further comprising instructions that cause the processor to provide a graphical user interface that allows the participant to interact with and manipulate the financial plan including the draw down strategies.

9. The system of claim 1, further comprising instructions that cause the processor to validate parameters associated with the tax-deferred account and the account to which the distribution is to be deposited, wherein the parameters include a minimum withdrawal amount for the tax-deferred account or a minimum deposit amount to the account to which the distribution is to be deposited.

10. The system of claim 1, further comprising instructions that cause the processor to determine whether the distribution code provided by the participant is a code for a normal distribution, a code for a premature distribution, a code for a premature exception distribution, a code for a disability distribution, or a code for a death distribution.

11. The system of claim 1, further comprising instructions that cause the processor to determine whether the distribution type is a one-time distribution or a recurring distribution.

12. The system of claim 1, further comprising instructions that cause the processor to provide alternative accounts from which the distribution is to be withdrawn, or providing alternative accounts to which the distribution is to be deposited.

13. The system of claim 1, further comprising:
   instructions that cause the processor to receive information related to at least one external account held by the participant; and
   instructions that cause the processor to calculate required minimum distributions using financial data associated with the at least one external account and the tax-deferred account.

14. A system for a portal from which a self-service distribution from a tax-deferred account is initiated, the system comprising:
   a processor;
   a computer-readable medium coupled to the processor and storing a plurality of instructions, the processor configured to;
   authenticate a participant to which the self-service distribution is to be made;
   provide a series of user interfaces to guide the self-service distribution;
   provide a financial plan including draw down strategies;
   receive information regarding an account to which the distribution is to be deposited;
   determine a distribution type and distribution code;
   determine if taxes are to be withheld from the distribution;
   provide the distribution to the participant;
   determine if a tax-deferred account has been opened longer than a predetermined period of time;
   disallow the distribution if the tax-deferred account has not been opened for the predetermined period of time; and
   validate parameters associated with the tax-deferred account and the account to which the distribution is to be deposited, wherein the parameters include a minimum withdrawal amount for the tax-deferred account or a minimum deposit amount to the account to which the distribution is to be deposited.

15. The system of claim 14, further comprising instructions that cause the processor to determine if taxes are to be withheld based on a customer record associated with the participant, the customer record including a state of residence.

16. The system of claim 14, further comprising instructions that cause the processor to apply a penalty if the participant is less than a predetermined age.

17. The system of claim 14, further comprising instructions that cause the processor to provide a warning to the participant of adverse tax consequences of the distribution.

18. A system for a portal from which a self-service distribution from a tax-deferred account is initiated, the system comprising:
   a processor;
   a computer-readable medium coupled to the processor and storing a plurality of instructions, the processor configured to;
   authenticate a participant to which the self-service distribution is to be made;
   provide a series of user interfaces to guide the self-service distribution;
   provide a financial plan including draw down strategies;
   receive information regarding an account to which the distribution is to be deposited;
   determine a distribution type and distribution code;
   determine if taxes are to be withheld from the distribution;
   provide the distribution to the participant; instructions that cause the processor to determine if a tax-deferred account has been opened longer than a predetermined period of time;
   disallow the distribution if the tax-deferred account has not been opened for the predetermined period of time; and
   determine whether the distribution type is a one-time distribution or a recurring distribution.

19. The system of claim 18, further comprising instructions that cause the processor to determine if taxes are to be withheld based on a customer record associated with the participant, the customer record including a state of residence.

20. The system of claim 18, further comprising instructions that cause the processor to apply a penalty if the participant is less than a predetermined age.

\* \* \* \* \*